(12) United States Patent
Miller, III

(10) Patent No.: US 8,848,311 B2
(45) Date of Patent: Sep. 30, 2014

(54) LOW TEMPERATURE CATALYST FOR DISK DRIVES ARTICLE AND METHOD

(75) Inventor: Stanley B. Miller, III, Eden Prairie, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/807,459

(22) PCT Filed: Jul. 2, 2011

(86) PCT No.: PCT/US2011/042901
§ 371 (c)(1),
(2), (4) Date: May 16, 2013

(87) PCT Pub. No.: WO2012/003505
PCT Pub. Date: Jan. 5, 2012

(65) Prior Publication Data
US 2014/0030179 A1    Jan. 30, 2014

Related U.S. Application Data

(60) Provisional application No. 61/361,191, filed on Jul. 2, 2010.

(51) Int. Cl.
*G11B 33/14*    (2006.01)

(52) U.S. Cl.
CPC .......... *G11B 33/1406* (2013.01); *G11B 33/146* (2013.01); *Y10S 360/90* (2013.01)
USPC ...... 360/97.11; 360/97.12; 360/900

(58) Field of Classification Search
USPC .......... 360/97.11, 97.12, 900; 423/245.3
See application file for complete search history.

(56) References Cited

U.S. PATENT DOCUMENTS

| | | | |
|---|---|---|---|
| 6,433,957 B1 | 8/2002 | Rudd et al. | |
| 7,300,500 B2 * | 11/2007 | Okada et al. | 96/153 |
| 7,445,654 B2 * | 11/2008 | Wong | 55/385.6 |
| 7,478,760 B2 * | 1/2009 | Beatty et al. | 236/44 A |
| 7,622,096 B2 | 11/2009 | Deeba et al. | |

(Continued)

FOREIGN PATENT DOCUMENTS

| | | |
|---|---|---|
| JP | 2001291288 | 10/2001 |
| JP | 2003064247 | 3/2003 |

(Continued)

OTHER PUBLICATIONS

International Preliminary Report on Patentability, for PCT/US2011/042901, mailed Jan. 17, 2013, 8 pages.

(Continued)

*Primary Examiner* — Timothy Vanoy
(74) *Attorney, Agent, or Firm* — Pauly, Devries Smith & Deffner, LLC

(57) ABSTRACT

An article and method for degrading volatile organic compounds in an electronic enclosure is disclosed. The method comprises providing a substrate, such as a scrim material, and applying a catalyst to the substrate. The catalyst typically includes a base metal. The substrate and catalyst material are placed into a disk drive (or other electronic) enclosure where they help in degradation of organic compounds, in particular volatile organic compounds. In certain implementations the base metal is selected from the group of manganese, vanadium, nickel, copper, cobalt, chromium, iron, or combinations thereof.

19 Claims, 2 Drawing Sheets

(56) References Cited

U.S. PATENT DOCUMENTS

| | | |
|---|---|---|
| 7,629,070 B2 | 12/2009 | Mehler et al. |
| 2008/0165447 A1* | 7/2008 | Lee et al. ............ 360/97.02 |
| 2008/0254321 A1 | 10/2008 | Kehren et al. |
| 2009/0025561 A1 | 1/2009 | Tuma |
| 2009/0244769 A1 | 10/2009 | Dai et al. |
| 2010/0157468 A1* | 6/2010 | Shen .................... 360/97.02 |
| 2011/0261483 A1* | 10/2011 | Campbell et al. ..... 360/97.02 |

FOREIGN PATENT DOCUMENTS

| | | |
|---|---|---|
| JP | 2004054997 | 2/2004 |
| JP | 2004177633 | 6/2004 |
| WO | 2012003505 | 1/2012 |

OTHER PUBLICATIONS

International Search Report and Written Opinion, for PCT/US2011/042901, mailed Feb. 27, 2012, 13 pages.

\* cited by examiner

LOW TEMPERATURE CATALYST FOR DISK DRIVES ARTICLE AND METHOD

This application is a national stage application under 35 U.S.C. 371 of International Patent Application Serial No.: PCT/EP2011/042901, entitled "LOW TEMPERATURE CATALYST FOR DISK DRIVES ARTICLE AND METHOD," filed Jul. 2, 2011, which claims the benefit of U.S. Provisional Application No. 61/361,191, filed Jul. 2, 2010, which applications are incorporated herein by reference in their entirety.

FIELD OF THE INVENTION

The present invention is directed to a method and article for degrading hydrocarbon contaminants in an enclosed environment, in particular within a disk drive or similar electronic enclosure where high cleanliness is desired.

BACKGROUND

Organic contaminants, in particular volatile organic compounds (VOCs), are a significant problem in disk drive enclosures, where very high cleanliness requirements are necessary for proper performance. The organic compounds can accumulate on drive surfaces, including read-write heads and on the disks themselves, and can interfere with performance of the drives. In extreme cases the organic contaminants can lead to drive failure.

Adsorbent materials, such as activated carbon, are suitable for use in sequestering some hydrocarbon materials from within disk drive enclosures. However, activated carbon has limited performance on removing some hydrocarbons, including certain volatile organic compounds. Also, activated carbon has capacity limits, and can become saturated at heightened levels of contamination or following long term use, after which removal of hydrocarbons diminishes or stops.

Therefore, a need exists for a way to reduce organic compounds, in particular hydrocarbons, and especially volatile organic compounds, from within disk drive environments.

SUMMARY OF THE INVENTION

The present invention is directed to an article and method for degrading volatile organic compounds in an electronic enclosure. The method comprises providing a substrate, such as a scrim material, and applying a catalyst to the substrate. The catalyst typically allows degradation of VOCs at relatively low temperatures, such as below 100° C., and often as low as 70° C. The substrate and catalyst material are suitable for placement inside a disk drive enclosure, where they assist in degradation of organic compounds.

The catalyst can include one or more base metals. In certain implementations the base metals are selected from the group of manganese, vanadium, copper, cobalt, chromium, iron, nickel, lead, zinc, and combinations thereof. It is possible to combine these base metals in a variety of ways, using two, three, four or more different base metals.

The catalyst loading per unit area of substrate will typically vary between 1 to 100 mg/in$^2$ of the base metal catalyst, measured as the weight of the oxides of the base metal catalyst applied to the substrate. In some implementations the catalyst loading per unit area of substrate will be less than 100 mg/in$^2$, in some cases less than 50 mg/in$^2$, and in other cases less than 10 mg/in$^2$.

In an example implementation the catalyst is coated onto the substrate as an aqueous slurry dispersion containing the base metal catalyst oxide or oxides or oxide precursors. An organic or inorganic binder may also be added to the aqueous slurry dispersion as an adhesion aid. Example organic binders are acrylic latex based binder materials. Examples of inorganic based binders are colloidal silica or colloidal alumina liquids. Other additives may or may not be used to affect slurry rheology or drying parameters. Various promoters may also be used with the base metal catalysts, such as (optionally) chromium and molybdenum.

The catalyst slurry may be coated onto the substrate using various coating application methods, such as dip, spray, drawdown, silkscreen or screen printing, gravure or rotogravure, and combinations thereof. The wet catalyst coated substrate may be dried to reduce moisture content using various drying methods such as ambient drying, radiant or convective heat, microwave, infrared, and combinations thereof. The temperature at which drying takes place varies significantly and is dependent upon substrate type, catalyst type, binder type, and types of other additives used. A preferable drying temperature embodiment is 40 to 130° C. The loading may be achieved in single or multiple successive coating steps, with or without drying in between coats.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

FIGURES

The invention will now be understood by review of the following drawings.

Figure 1:
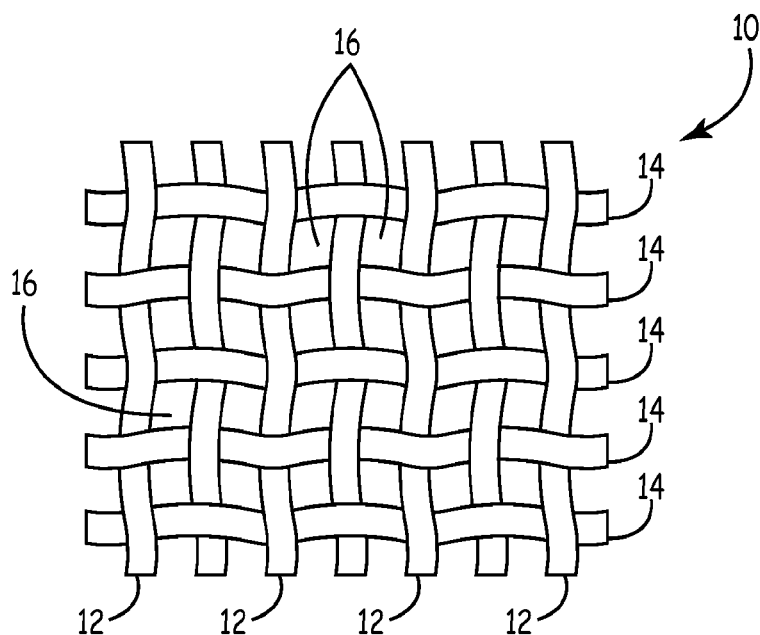
FIG. 1 shows a close-up of a portion of scrim material onto which a base metal catalyst has been applied, the scrim and catalyst constructed and arranged in accordance with an implementation of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The present invention is directed, in part, to materials and methods for degrading volatile organic compounds in an electronic enclosure, such as a disk drive. The method comprises providing a substrate, such as a scrim material, and applying a catalyst to the substrate. The catalyst is able to at least partially degrade volatile organic compounds, such as acetone, at ambient temperatures present within a disk drive when the drive is in operation.

Those temperatures within an electronic enclosure are often 70° C. or higher. Therefore, the catalyst will generally be functional at temperatures as low as 70° C. in certain embodiments, although higher operating temperatures are suitable for some implementations. Thus, in some implementations the base metal catalyst results in a reduction in volatile organic compounds in the electronic enclosure at a temperature of less than 80° C. In other implementations the base metal catalyst results in a reduction in volatile organic compounds in the electronic enclosure at a temperature of less than 90° C. In yet other implementations the base metal catalyst results in a reduction in volatile organic compounds in the electronic enclosure at a temperature of less than 100° C. In each of these implementations the reduction is typically at least 10 percent of the VOCs within the electronic enclosure, preferably at least 20 percent, and advantageously greater than 30 percent.

The catalyst, which can also be referred to as a "low temperature catalyst", generally comprises base metals (which generally refer to metals that oxidize or corrode relatively easily, and which react variably with hydrochloric acid (HCl) to form hydrogen), often in the form of base metal oxides. The substrate is coated with the catalyst material and placed into a disk drive enclosure where the combination helps in degradation of organic compounds.

In certain implementations the base metals are selected from the group of manganese, vanadium, copper, cobalt, chromium, iron, nickel, lead, zinc, and combinations thereof. In certain implementations the base metal is selected from the group of iron, nickel, lead, zinc, and combinations thereof. In some implementations the base metal comprises copper. It will be understood that the base metals will often be present in the form of salts, oxides, and other forms other than pure metals. Combinations of two or more of these metals can also be used. Furthermore, various other metals and metal containing compounds (such as metal oxides) can be used with the base metals.

The catalyst loading per unit area of substrate will typically vary between 1 to 100 mg/in$^2$ of the base metal catalyst, measured as the weight of the oxides of the base metal catalyst applied to the substrate. In some implementations the catalyst loading per unit area of substrate will be less than 100 mg/in$^2$, in some cases less than 50 mg/in$^2$, and in other cases less than 10 mg/in$^2$. It is also possible, under some implementations, to have greater than 100 mg/in$^2$ of catalyst. As used herein, the unit area of the substrate refers to the overall size of the substrate (such as 1 cm by 1 cm piece of scrim, as opposed to the total surface area of all of the fibers making up the scrim).

The loading per unit area is generally established so as to have sufficient degradation of volatile organic compounds without application of excess catalyst, which can add significant costs without significant improvements in performance. Also, in view of the relatively low concentrations of VOCs within typical electronic enclosures, it can be acceptable to have relatively low concentrations of the catalyst material, even if such low concentrations of catalyst material results in a slower rate of degradation of the VOCs.

Various promoters may also be used with the base metal catalysts, such as (optionally) chromium and molybdenum. In some implementations the catalyst may be embedded into another material, such as distearylamine (DSA) or polyethylene glycol (PEG) to reduce pyrophoric nature of the base metal catalyst.

The functioning temperature of the catalyst is generally below 100° C., optionally below 90° C., optionally below 80° C., and optionally below 70° C.; however the catalyst generally performs better at higher temperatures within these ranges. The article containing the catalyst is desirably placed in a higher temperature region of the electronic enclosure, to the extent temperature variations exist. It is also often highly desirable to have the article in a position of high airflow, such as in proximity to air currents created by the spinning of disks within a disk drive enclosure.

In certain embodiments the efficiency of the catalyst will decline at lower temperatures. Single pass conversion of VOCs of greater than 2 percent is acceptable for some embodiments, more than 5 percent is more favorable, greater than 10 percent is desirable, more desirably greater than 20 percent, and more desirably greater than 30 percent. Overall conversion of VOCs within the disk drive enclosure of greater than 50 percent is desired, and preferably greater than 60 percent, and more desirably greater than 70 percent.

The catalyst can be applied as an aqueous solution, wherein it is sprayed on the substrate, the substrate is dipped into the aqueous solution, or the aqueous solution is otherwise applied to the substrate. Suitable substrates include, without limitation, woven and non-woven materials. Scrims, such as polyester scrims, can be used. Also, activated carbon, including activated carbon tablets, webs, and particles can be impregnated with the catalyst to provide enhanced degradation of VOCs within an electronic enclosure. The substrate may also be, for example, plastic, ceramic, fabric, paper, metal, or combinations thereof.

When applied to a substrate, the catalyst can be applied to the entire substrate or merely to a portion of the substrate. Also, the catalyst can be applied to a single layer of a substrate (such as a scrim), or to multiple layers of a substrate (such as a stacked scrim arrangement). As noted above, when in use within an electronic enclosure, it is desirable to have the catalyst be exposed to moving air streams so as to increase contact between the catalyst-containing substrate and the VOCs. Thus, the catalyst-containing substrate is particularly well suited to use in recirculation filters wherein the catalyst-containing substrate, such as a scrim, is in direct contact with air flows.

Also, it will be understood that the catalyst-containing substrate may be combined with other materials that do not contain catalysts. For example, a catalyst coated scrim can be paired with an electrostatic material or an adsorbent material, such as activated carbon. When used with an electrostatic material, the catalyst coated scrim is provided to reduce VOCs, while the electrostatic material can capture moving particles. When used with an adsorbent material, the catalyst can lower the level of VOCs so as to reduce the quantity of adsorbent material that is present. Also, the adsorbent material can remove organic compounds that are not eliminated by the catalyst.

Now, in reference to the figures, various example implementations of the invention are shown. In FIG. 1, a scrim material 10 (such as a polyester scrim) is shown in enlarged view. The scrim material 10 is composed of a series of first fibers 12 interwoven with second fibers 14. The interweaving of fibers 12 and 14 is such that the fibers form gaps or spaces 16. These gaps or spaces 16 allow for air to circulate through the scrim material 10. Although not shown in FIG. 1, the scrim material 10 is coated with a catalyst-containing solution. The addition of the catalyst can slightly reduce the size of the gaps or spaces 16, but in general the size of the gaps or spaces 16 is substantially preserved. Thus, even after the catalyst is applied to the scrim material 10, air can still readily flow through the scrim, allowing significant contact between recirculating VOCs in the air stream with the catalyst-containing surface of the scrim. The scrim material 10 shown in FIG. 1 is a woven material. However, it will be understood that non-woven materials are also suitable for use as substrates in accordance with the present invention, including the use of non-woven scrims.

Figure 2:
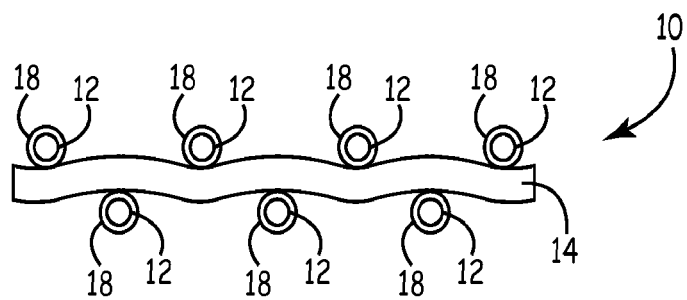
FIG. 2 shows a close-up cross section of the scrim material of FIG. 1, constructed and arranged in accordance with an implementation of the invention.

FIG. 2 shows a cross section of the scrim material 10 of FIG. 1, with first fibers 12 in cross section. The fibers 12 include a coating 18 of a catalyst material. The thickness of the coating 18 is not drawn to scale, but is merely made to represent an implementation where catalyst substantially coats the fibers while still allowing space for the flow of air between coated fibers. Fibers 14 in the cross-direction would also typically contain a catalyst coating, since the catalyst would be added after the scrim is formed, and would be added by coating, spraying, or other similar process that applies catalyst containing solutions to both first fibers 12 and second fibers 14. It will be understood as well that the catalyst coating need not be uniformly applied to the substrate. It is possible, for example, to randomly apply the catalyst so only portions of the scrim are coated. Also, it is possible to spray-coat (or otherwise apply the catalyst) so that only a top surface of the scrim receives the catalyst, and the bottom surface is generally free of catalyst material. This can be appropriate, for example, when the placement of the scrim within an electronic enclosure is such that the top surface is in contact with the greatest air flow. By having the catalyst localized to those areas with highest air flow, the efficiency of removing the VOCs is enhanced relative to the amount of catalyst used.

Figure 3:
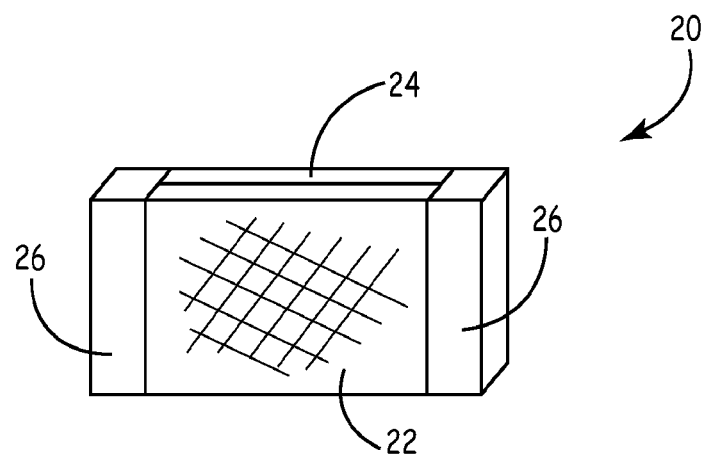
FIG. 3 shows a simplified perspective view of a recirculation filter arrangement having a scrim material coated with a low-temperature catalyst and a separate electrostatic material, constructed and arranged in accordance with an implementation of the invention.

Now, reference is made to FIG. 3, which shows a simplified view of an example recirculation filter containing a catalyst scrim made in accordance with an implementation of the invention. The filter 20 includes two media elements: a scrim sheet 22 and an electrostatic sheet 24. The scrim sheet 22 is coated or impregnated with a low temperature catalyst, and allows degradation of VOCs, while the electrostatic sheet 24 allows capture of small charged particles. The scrim sheet 22 and electrostatic sheet 24 of the filter 20 are shown aligned against one another, touching one another, and retained at their sides 26. In this example configuration air recirculating in a disk drive can have VOCs and particulate contaminants reduced. It will be understood that the scrim sheet 22 can be used without an electrostatic, and that a multitude of different ways of mounting the scrim sheet 22 into a disk drive enclosure are possible. Also, in alternative embodiments the scrim sheet and electrostatic sheet are not in contact with one another, but rather are separated from one another. Also, it is possible to mount the scrim in a manner such that air flows across the face of the scrim sheet, rather than through the scrim sheet. Furthermore, certain embodiments contain more than one layer of catalyst-coated scrim material.

Figure 4:
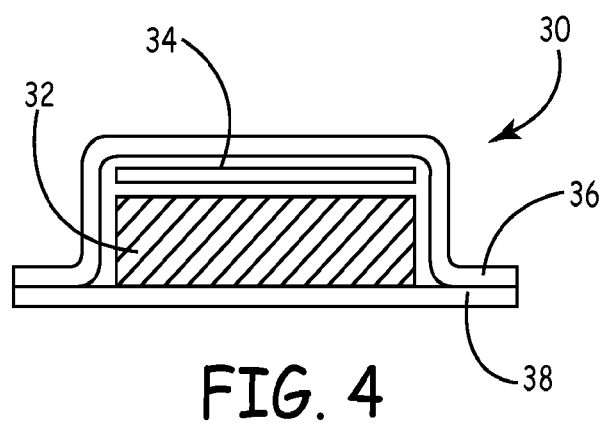
FIG. 4 shows a filter arrangement containing a scrim material coated with a low-temperature catalyst, along with a carbon tablet and a PTFE cover, constructed and arranged in accordance with an implementation of the invention.

Referring now to FIG. 4, an example of an alternative filter arrangement 30 is shown in cross section, with an activated carbon tablet 32 onto which a catalyst-containing scrim 34 has been placed, and which is enclosed by a polytetrafluoroethylene (PTFE) top layer 36 and a base material 38 (the base material can be, for example, a polyester film). In the filter arrangement 30 of FIG. 4, the scrim 34 degrades hydrocarbons, including VOCs that are not captured by the carbon tablet 32.

It will be understood that the designs shown in FIGS. 1 to 4 are merely illustrative examples of articles for removing VOCs from electronic enclosures, especially low temperature catalyst materials.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise. It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

This application is intended to cover adaptations or variations of the present subject matter. It is to be understood that the above description is intended to be illustrative, and not restrictive. It should be readily apparent that any one or more of the design features described herein may be used in any combination with any particular configuration. The scope of the present subject matter should be determined with reference to the appended claims, along with the full scope of equivalents to which such claims are entitled.

What is claimed is:

1. An article for reducing volatile organic compounds in an electronic enclosure, the article comprising:
   a scrim material; and
   a base metal catalyst coating the scrim;
   wherein the base metal catalyst reduces volatile organic compounds at a temperature of less than 100° C.

2. The contaminant reducing article for reducing volatile organic compounds of claim 1, wherein the base metal of the base metal catalyst is selected from the group of iron, nickel, lead, zinc, and combinations thereof.

3. The contaminant reducing article for reducing volatile organic compounds of claim 1, wherein the base metal of the base metal catalyst is selected from the group of manganese, vanadium, copper, cobalt, chromium, iron, nickel, lead, zinc, and combinations thereof.

4. The contaminant reducing article for reducing volatile organic compounds of claim 1, wherein the base metal of the base metal catalyst is provided as an oxide.

5. The contaminant reducing article for reducing volatile organic compounds of claim 1, wherein the scrim comprises a woven material.

6. The contaminant reducing article for reducing volatile organic compounds of claim 1, wherein the scrim comprises a non-woven material.

7. The contaminant reducing article for reducing volatile organic compounds of claim 1, wherein the scrim comprises activated carbon.

8. The contaminant reducing article for reducing volatile organic compounds of claim 1, wherein the scrim comprises a polyester scrim.

9. The contaminant reducing article for reducing the volatile organic compounds of claim 1, further comprising a catalysis promoter.

10. The contaminant reducing article for reducing the volatile organic compounds of claim 1, wherein the base metal catalyst is present on the scrim at a concentration of 1 to 100 mg/in$^2$.

11. The contaminant reducing article for reducing the volatile organic compounds of claim 1, wherein the base metal catalyst is present on the scrim at a concentration of less than 100 mg/in².

12. A method of degrading volatile organic compounds in an electronic enclosure, the method comprising:
   providing a substrate;
   applying a catalyst to the substrate; and
   placing the substrate and catalyst material into an electronic enclosure;
   wherein the catalyst comprises a base metal.

13. The method of degrading volatile organic compounds in an electronic enclosure of claim 12, wherein the base metal of the base metal catalyst is selected from the group of manganese, vanadium, copper, cobalt, chromium, iron, nickel, lead, zinc, and combinations thereof.

14. The method of degrading volatile organic compounds in an electronic enclosure of claim 12, wherein the base metal catalyst is present on the substrate at a concentration of less than 100 mg/int.

15. The method of degrading volatile organic compounds in an electronic enclosure of claim 12, further comprising a promoter.

16. The method of degrading volatile organic compounds in an electronic enclosure of claim 12, wherein the promoter comprises molybdenum.

17. The method of degrading volatile organic compounds in an electronic enclosure of claim 12, wherein base metal catalyst results in at least 20 percent reduction in volatile organic compounds in the electronic enclosure.

18. The method of degrading volatile organic compounds in an electronic enclosure of claim 12, wherein base metal catalyst results in a reduction in volatile organic compounds in the electronic enclosure at a temperature of less than 100° C.

19. An electronic enclosure containing an article for reducing volatile organic compounds in an electronic enclosure, the electronic enclosure containing article comprising:
   a scrim material; and
   a base metal catalyst coating the scrim;
   wherein the base metal catalyst reduces volatile organic compounds at a temperature of less than 100° C.

* * * * *